US012183085B2

(12) United States Patent
Yamamoto et al.

(10) Patent No.: US 12,183,085 B2
(45) Date of Patent: Dec. 31, 2024

(54) APPARATUS, IMAGE DISPLAY METHOD, IMAGE DISPLAY SYSTEM, AND STORAGE MEDIUM STORING PROGRAM

(71) Applicant: CANON KABUSHIKI KAISHA, Tokyo (JP)

(72) Inventors: Tatsuya Yamamoto, Tokyo (JP); David Johnston, New South Wales (AU); Nicholas Fulton, New South Wales (AU); Julie Kowald, New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 547 days.

(21) Appl. No.: 17/501,830

(22) Filed: Oct. 14, 2021

(65) Prior Publication Data

US 2022/0118917 A1    Apr. 21, 2022

(30) Foreign Application Priority Data

Oct. 21, 2020  (JP) ................................. 2020-176843

(51) Int. Cl.
*G06V 20/56* (2022.01)
*G06V 20/68* (2022.01)

(52) U.S. Cl.
CPC ........ *G06V 20/56* (2022.01); *B60R 2300/105* (2013.01); *B60R 2300/30* (2013.01); *B60Y 2200/22* (2013.01); *G06V 20/68* (2022.01)

(58) Field of Classification Search
None
See application file for complete search history.

(56) References Cited

U.S. PATENT DOCUMENTS

2019/0279353 A1* 9/2019 Kowald ............... G06V 20/182
2020/0210698 A1* 7/2020 Yamamoto ............ G06Q 50/02

FOREIGN PATENT DOCUMENTS

JP        2001120042 A     5/2001

* cited by examiner

*Primary Examiner* — Samah A Beg
(74) *Attorney, Agent, or Firm* — Canon U.S.A., Inc. IP Division

(57) ABSTRACT

To appropriately determine the display order of a plurality of images captured by at least one image capturing apparatus installed on a movable body, based on an imaging direction of the image capturing apparatus, an apparatus identifies the imaging direction of the image capturing apparatus in capturing each of the plurality of images, and determines the display order of the plurality of images based on a result of the identification.

35 Claims, 11 Drawing Sheets

| IMAGE ID | IMAGE FILE | INSTALLATION LOCATION | IMAGING POSITION | HEDGE NUMBER |
|---|---|---|---|---|
| L1 | L_IMG_0001.JPG | LEFT | x1, y1 | 1 |
| L2 | L_IMG_0002.JPG | LEFT | x2, y2 | 1 |
| L3 | L_IMG_0003.JPG | LEFT | x3, y3 | 1 |
| ⋮ | | | | |
| L100 | L_IMG_0100.JPG | LEFT | x100, y100 | 1 |
| L101 | L_IMG_0101.JPG | LEFT | x101, y101 | 4 |
| ⋮ | | | | |

302

| IMAGE ID | IMAGE FILE | INSTALLATION LOCATION | IMAGING POSITION | HEDGE NUMBER |
|---|---|---|---|---|
| R1 | R_IMG_0001.JPG | RIGHT | x1, y1 | 2 |
| R2 | R_IMG_0002.JPG | RIGHT | x2, y2 | 2 |
| R3 | R_IMG_0003.JPG | RIGHT | x3, y3 | 2 |
| ⋮ | | | | |
| R100 | R_IMG_0100.JPG | RIGHT | x100, y100 | 2 |
| R101 | R_IMG_0101.JPG | RIGHT | x101, y101 | 3 |
| ⋮ | | | | |

FIG.4

| DISPLAY IMAGE ID | IMAGE ID | HEDGE NUMBER |
|---|---|---|
| 1 | L1 | 1 |
| 2 | L2 | 1 |
| 3 | L3 | 1 |
| ⋮ | ⋮ | ⋮ |
| 100 | L100 | 1 |
| 101 | R100 | 2 |
| 102 | R99 | 2 |
| ⋮ | ⋮ | ⋮ |

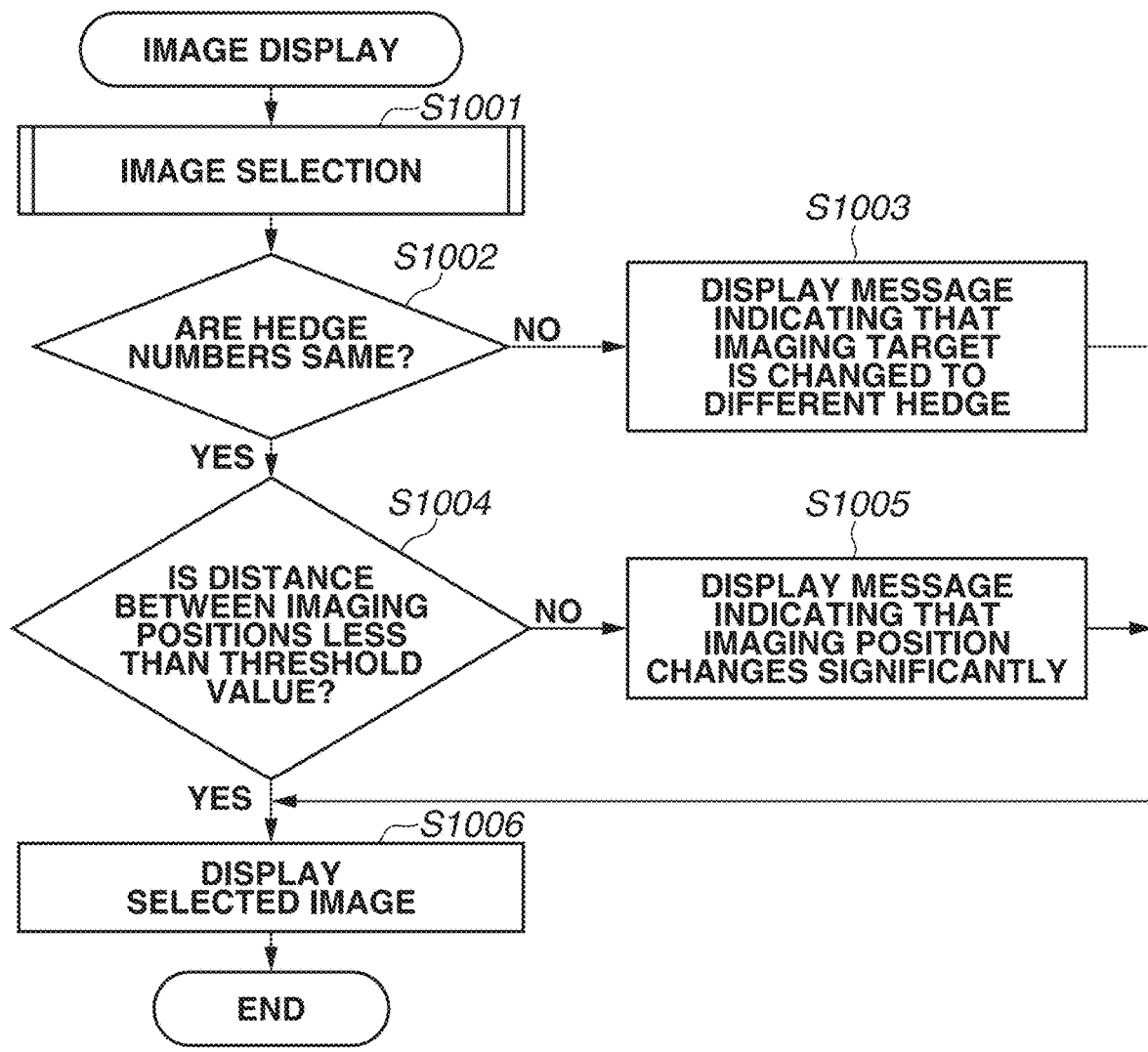

APPARATUS, IMAGE DISPLAY METHOD, IMAGE DISPLAY SYSTEM, AND STORAGE MEDIUM STORING PROGRAM

BACKGROUND

Field

The present invention relates to image display.

Description of the Related Art

Recently, in the agricultural field, a method for keeping track of the condition of a farm such as occurrence of a disease and an equipment failure has been provided. In the method, images of the actual site are captured by cameras and the growing conditions of the crops are recorded using the captured images.

Japanese Patent Application Laid-Open No. 2001-120042 discusses a method in which images of a farm captured by a camera installed on a vehicle are managed in association with positional information indicating the locations where the images have been captured, and the image captured at a designated location in the entire farm is displayed in an enlarged view.

To check the condition of the farm, the displayed image may be changed continuously. In this case, a commonly-used image viewer changes the currently displayed image to the next image in the order of image capturing in response to a press of the right button, or changes the currently displayed image to the previous image in the order of image capturing in response to a press of the left button.

Meanwhile, for example, grapes for wine are normally grown using hedge cultivation in which fruit trees are planted and grown in hedge rows. In a farm using such hedge cultivation where fruit trees are planted in hedge rows, the growing conditions may be recorded using cameras installed on both sides of a vehicle and configured to capture images while the vehicle moves between the hedges, instead of using a single camera in terms of efficiency.

Suppose that the images captured in the above-described condition are sequentially changed and displayed. If the right button is pressed to display the next image in the order of image capturing and if the currently displayed image is captured by the camera installed for capturing images of crops on the right side of the vehicle in the traveling direction of the vehicle, the image of a crop located immediately on the left side of a crop in the currently displayed image is displayed as the next image although the right button is pressed. On the other hand, if the right button is pressed and if the currently displayed image is captured by the camera installed for capturing images of crops on the left side of the vehicle in the traveling direction, the image of a crop located immediately on the right side of a crop in the currently displayed image is displayed as the next image.

As described above, the positional relationship between the button and the display target sometimes matches but does not sometimes match. This may confuse the user about how the images are displayed. Therefore, there is room for improvement in usability.

SUMMARY OF THE INVENTION

According to an aspect of the present invention, an apparatus includes one or more processors, wherein the one or more processors function as an acquisition unit configured to acquire a plurality of images captured by at least one image capturing apparatus installed on a movable body, an identification unit configured to identify an imaging direction of the at least one image capturing apparatus in capturing each of the plurality of images, with respect to a traveling direction of the movable body, a determination unit configured to determine a display order of the plurality of images based on a result of the identification by the identification unit, and a display control unit configured to cause a display unit to display the plurality of images based on the determined display order.

Further features of the present invention will become apparent from the following description of exemplary embodiments with reference to the attached drawings.

BRIEF DESCRIPTION OF THE DRAWINGS

FIG. 3 is a diagram illustrating an example of a table for managing images.

FIG. 4 is a diagram illustrating an example of a table for managing display order of the images.

FIG. 10 is a flowchart illustrating an example of a message display operation.

DESCRIPTION OF THE EMBODIMENTS

An exemplary embodiment of the present invention will be described in detail below with reference to the attached drawings. Configurations described in the exemplary embodiment described below are mere examples, and the present invention is not limited to the configurations.

The exemplary embodiment is directed to appropriately determining the display order of a plurality of images captured by at least one image capturing apparatus installed on a movable body, based on an imaging direction of the image capturing apparatus.

In the present exemplary embodiment, an image display system for use in a farm where grapes for wine are grown will be described as an example. The image display system is configured to display images captured for recording the growing conditions of the grapes. In general, the grapes for wine are grown using hedge cultivation in which fruit trees are planted and grown in hedge rows. In the present exemplary embodiment, an image capturing system configured to capture images using right and left cameras installed on the sides of a tractor, which is a vehicle used in farming work, captures images automatically and simultaneously with the movement of the tractor in the farming work, so that the growing conditions of the grapes for wine in hedge cultivation are recorded more efficiently.

The image capturing system according to the present exemplary embodiment captures images covering the entire farm in such a manner that the tractor drives through the spaces between the hedges of the grape trees while skipping the next space so as not to capture duplicate images of the same tree.

Figure 7:
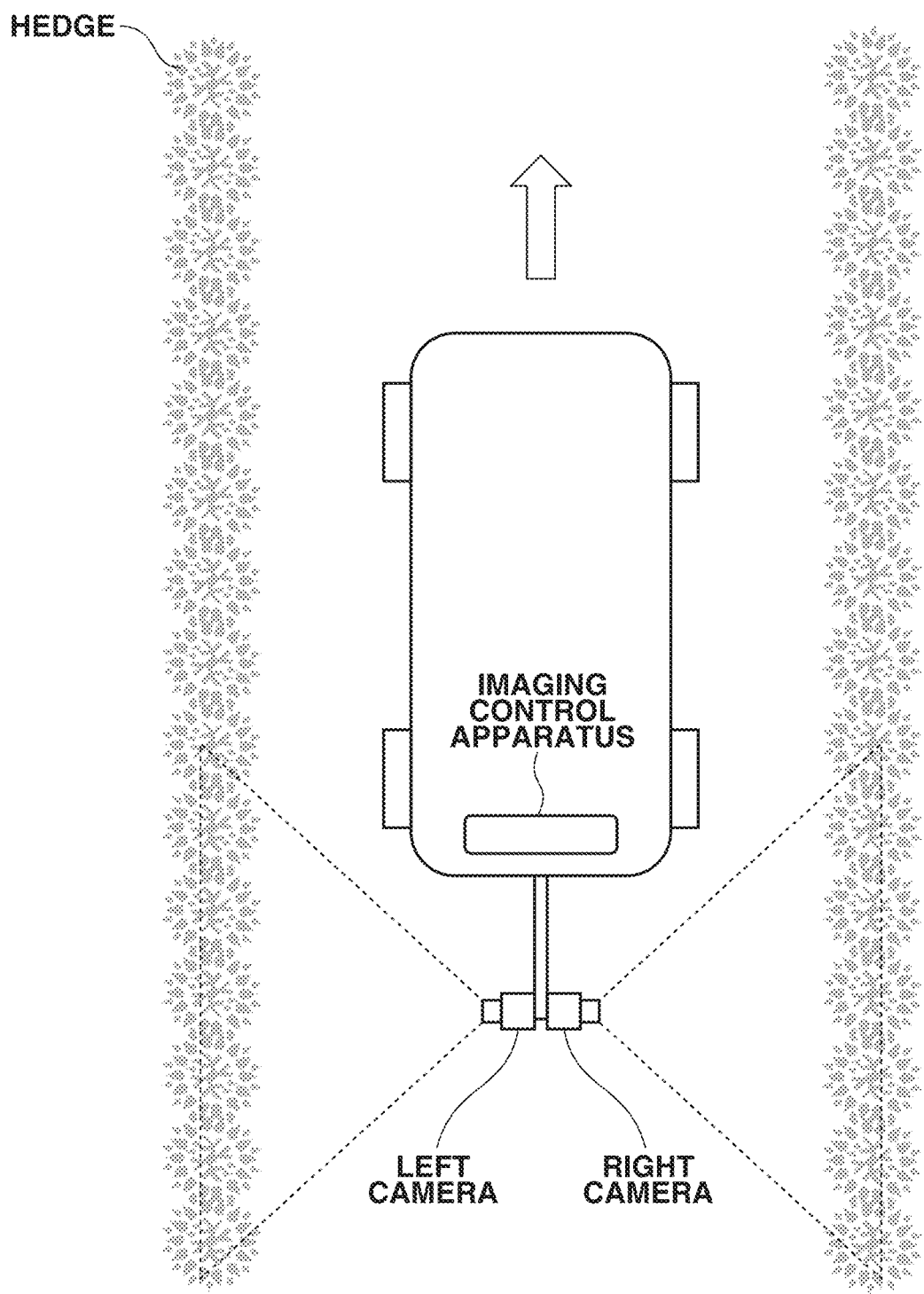
FIG. 7 is a view illustrating an example of how cameras are installed on both sides of a movable body.

FIG. 7 illustrates an example of a configuration of the image capturing system included in the image display system according to the present exemplary embodiment. FIG. 7 is a top view of the image capturing system. Referring to FIG. 7, the image capturing system includes an imaging control apparatus, the left camera, the right camera, and the movable body.

The imaging control apparatus controls imaging by the left camera and the right camera. The imaging control apparatus is, for example, a smartphone or a tablet personal computer (tablet PC) that can be carried and operated by a user. Each of the left camera and the right camera is installed on the movable body so that the optical axis is in the horizontal direction substantially perpendicular to the traveling direction (direction indicated by an arrow in FIG. 7) of the movable body. More specifically, the left camera captures images of a hedge on the left side with respect to the traveling direction of the movable body. The right camera captures images of a hedge on the right side with respect to the traveling direction of the movable body. In a wine grape farm where grape trees for wine are planted in hedge rows, installing the left and right cameras on the movable body in this manner allows the images of the grape trees of the hedges on both the left and right sides to be captured at a time while the movable body drives through the hedges. The number of image capturing apparatuses installed on the movable body can be one or three or more. While in the present exemplary embodiment, the configuration in which the plurality of separate cameras captures images of different directions has been described, the configuration is not limited thereto. Alternatively, a configuration in which a single camera including two image capturing units captures images of different directions may be used.

The movable body is, for example, a farming vehicle such as a tractor or a harvester. While the movable body is described as a farming vehicle such as a tractor or a harvester, the movable body is not limited thereto and may be another movable body such as an automobile, a truck, a motorcycle, or an aircraft such as a drone.

An example in which a user operates the movable body to control the driving of the movable body will be described below. Alternatively, the user may remotely operate the movable body, or the movable body may autonomously run.

Figure 8:
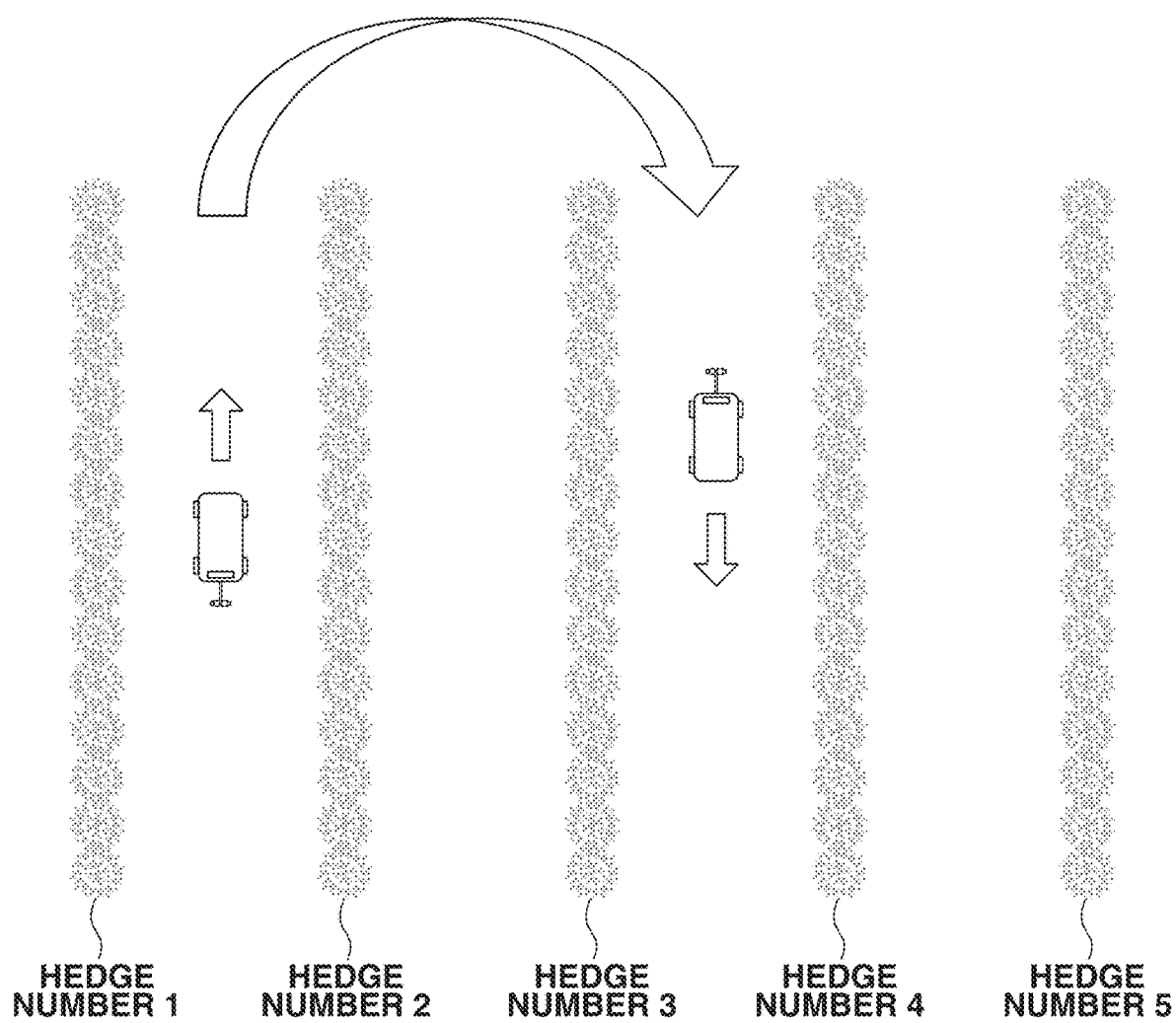
FIG. 8 is a view illustrating an example of how the movable body moves between hedges.

FIG. 8 illustrates the movable body that drives through the spaces between the hedges while skipping the next space. As illustrated in FIG. 8, the movable body is controlled to drive through the spaces between the hedges while skipping the next space, so that images of all the hedges can be captured efficiently.

Hereinafter, an image display apparatus that displays images captured by the above-described image capturing system will be described in detail. The image display apparatus according to the present exemplary embodiment acquires a plurality of images captured by at least one image capturing apparatus installed on the movable body. The image display apparatus then identifies an imaging direction of the image capturing apparatus in capturing each of the plurality of images, with respect to the traveling direction of the movable body. Based on the identification result, the image display apparatus appropriately determines the display order of the plurality of images, and performs display control to display the images based on the determined display order.

<Hardware Configuration>

Figure 1:
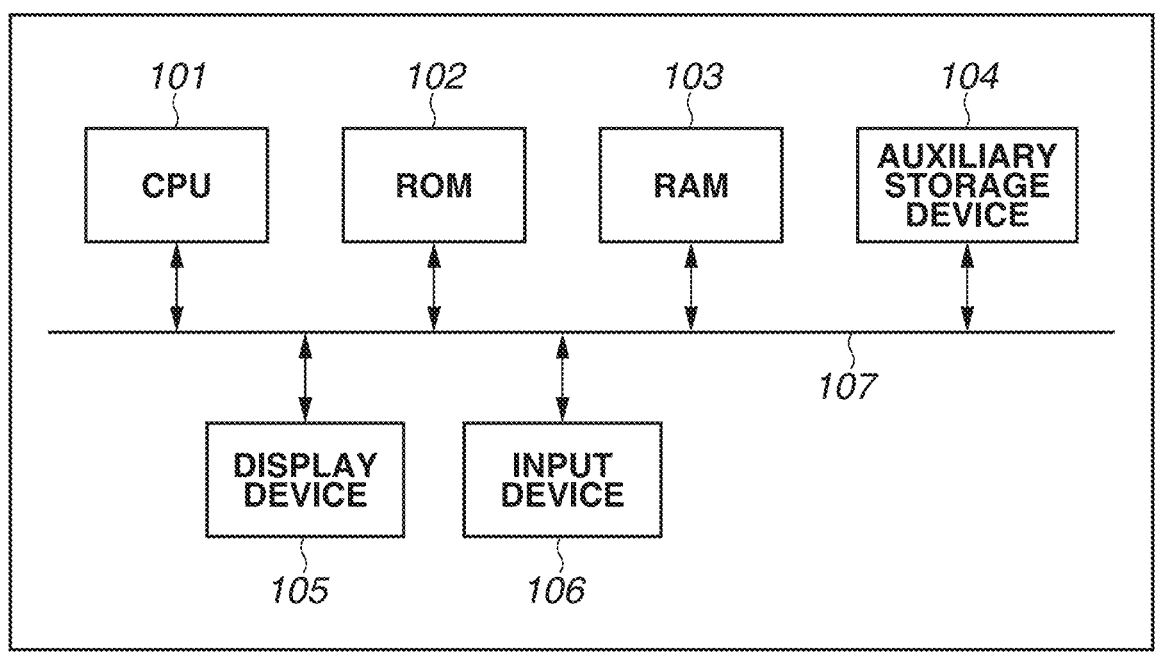
FIG. 1 is a diagram illustrating an example of a hardware configuration of an image display apparatus.

FIG. 1 illustrates a hardware configuration of the image display apparatus included in the image display system according to the present exemplary embodiment. A central processing unit (CPU) 101 performs calculation and logical determination for various types of processing, and controls each component connected to a system bus 107. A read-only memory (ROM) 102 is a program memory and stores programs, including various processing procedures (described below), for the control by the CPU 101. The program memory may be implemented by loading a program from an external storage apparatus connected to the image display apparatus into a random access memory (RAM) 103. The RAM 103 is used as a temporary storage area such as a main memory or work area of the CPU 101. The CPU 101 reads a program stored in the ROM 102 and executes the program, thereby implementing processing based on each flowchart to be described below. The program memory may be implemented by loading a program stored in the ROM 102 into the RAM 103. The CPU 101 writes an execution result of each processing to the ROM 102.

An auxiliary storage device 104 stores electronic data and programs according to the present exemplary embodiment, and retains the stored data even after power-off. The auxiliary storage device 104 is implemented by, for example, a medium (recording medium) and an external storage drive for implementing access to the medium. Examples of such a medium include a flash memory, a universal serial bus (USB) memory, a solid state drive (SSD) memory, a hard disk drive (HDD), a flexible disk (FD), a compact disk (CD)-ROM, a digital versatile disk (DVD), and a secure digital (SD) card. The auxiliary storage device 104 may be a server apparatus connected via a network. The auxiliary storage device 104 is, for example, a built-in SSD memory and may be unremovable from the CPU 101. In the present exemplary embodiment, a case where the auxiliary storage device 104 is an SD card for capturing data from the built-in SSD memory and an external source will be described below as an example. The program memory may be implemented by loading a program stored in the auxiliary storage device 104 into the RAM 103. The CPU 101 stores the execution result of each processing in the auxiliary storage device 104.

A display device 105 is, for example, a liquid crystal display or an organic electroluminescent (organic EL) display, and outputs images, characters, and graphics to a display screen according to the processing and control of the CPU 101. The display device 105 may be an external device that is wired or wirelessly connected to the image display apparatus.

An input device 106 is, for example, a touch panel, a button, or a mouse, and receives various user operations. The input device 106 may be a pressure touch panel or an electrostatic touch panel, which is attached to the display device 105 and is configured to sense user operations, or a light pen. The input device 106 may be an external device such as a mouse that is wired or wirelessly connected to the image display apparatus.

<Functional Configuration>

Figure 2:
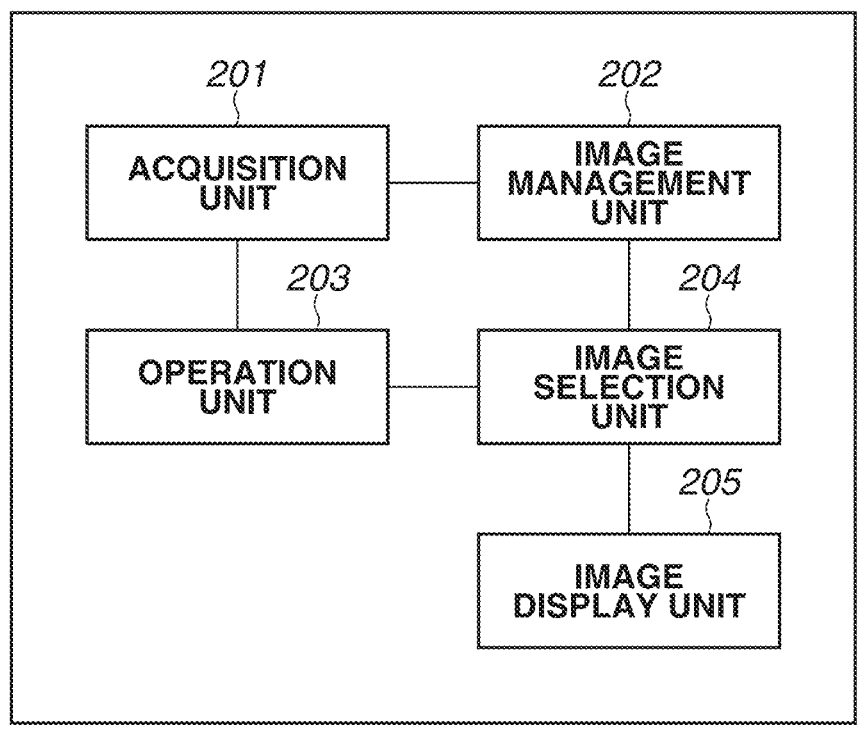
FIG. 2 is a diagram illustrating an example of a functional configuration of the image display apparatus.

FIG. 2 is an example of a block diagram illustrating a functional configuration of software of the image display apparatus according to the present exemplary embodiment. Each functional unit is implemented by the CPU 101 loading a program stored in the ROM 102 into the RAM 103 and executing the processing to be described below. In addition, for example, in a case where hardware is used in place of software processing using the CPU 101, a calculation unit or a circuit corresponding to the processing of each functional unit is configured. Each functional unit will be described next.

An acquisition unit 201 acquires captured image data externally via the SD card that is the auxiliary storage device 104. The acquisition unit 201 acquires captured image data representing an image captured by the above-described image capturing system. The captured image data contains not only the captured image but also attribute information indicating the installation location of the camera having captured the image, the position and direction where the image has been captured, the hedge for which the image has been captured, and the like.

An image management unit 202 manages the captured image data acquired by the acquisition unit 201 as image information using an image management table illustrated in FIG. 3 (described below). The captured image file and the image management table are stored in the SSD that is the auxiliary storage device 104.

An operation unit 203 receives, via the input device 106, an operation of designating an imaging position to select an image to be displayed, or an operation of pressing a button to change a displayed image. An image selection unit 204 selects the image to be displayed, based on the operation received by the operation unit 203. An image display unit 205 performs display control to display, on the display device 105, the image selected by the image selection unit 204.

<Flow of Processing>

Image display processing performed by the image display apparatus according to the present exemplary embodiment will be described next.

FIG. 3 illustrates image management tables 301 and 302 for managing image information, which are held by the image display apparatus. Referring to FIG. 3, the image management table 301 manages, as image information, information about images captured by the left camera installed on the left side of the movable body. The image management table 302 manages, as image information, information about images captured by the right camera installed on the right side of the movable body. In this example, the two image management tables 301 and 302 are separately used for the left and right cameras. Alternatively, a single management table may be used to manage image information. The image management tables 301 and 302 contain, as attributes, image identification (ID), image file, installation location, imaging position, and hedge number, and attribute values of the attributes. In other words, the image information according to the present exemplary embodiment represents the image ID, the image file, the installation location, the imaging position, and the hedge number. Not all the pieces of information are essential for the image information, and the image information may include at least one or some of the above-described information or may include the other information. Information about the imaging position in the image information is, for example, latitude and longitude information determined from the radio waves received from the Global Positioning System (GPS) satellite at the time of capturing the image. The hedge number in the image information is information for identifying a hedge of fruit trees planted in a row. In a case where the imaging targets are not hedges of grape trees for wine, the hedge number may be information for identifying each of a plurality of imaging targets.

Furthermore, the installation location in the image information represents the installation location of the camera on the movable body. The installation location also represents the imaging direction of the camera having captured the image, with respect to the traveling direction of the movable body. While in the present exemplary embodiment, information about the installation location of the camera is stored in association with the captured image, any other information for identifying the imaging direction with respect to the traveling direction of the movable body may be used instead of the installation location. For example, coordinate information may be used as the information for identifying the imaging direction with respect to the traveling direction of the movable body at the time of capturing the image. For example, coordinates on a unit circle on a two-dimensional plane are stored, and the orientation of the coordinates as a vector may be used as the imaging direction with respect to the traveling direction of the movable body. Alternatively, the information for identifying the imaging direction with respect to the traveling direction of the movable body at the time of capturing the image may be three-dimensional orientation information. In this case, for example, coordinates on a unit sphere in a three-dimensional space using the traveling direction of the movable body as axes are stored, and the orientation of the coordinates as a vector with respect to the axes corresponding to the traveling direction may be used as the imaging direction with respect to the traveling direction of the movable body.

In the image management tables 301 and 302, the image information is registered in the order of image capturing.

FIG. 4 illustrates a display order table 401 for managing display order of the images, which is stored by the image display apparatus and is generated from the image management tables 301 and 302 by processing in a flowchart illustrated in FIG. 6 (described below). The display order table 401 includes, as attributes, display image ID, image ID, and hedge number, and attribute values of the attributes. The display image ID represents the ID of the image being displayed and also represents the display order. The image display apparatus according to the present exemplary embodiment controls the display order of the images corresponding to the image information managed by the image management tables 301 and 302, based on the generated display order table 401.

Figure 5:
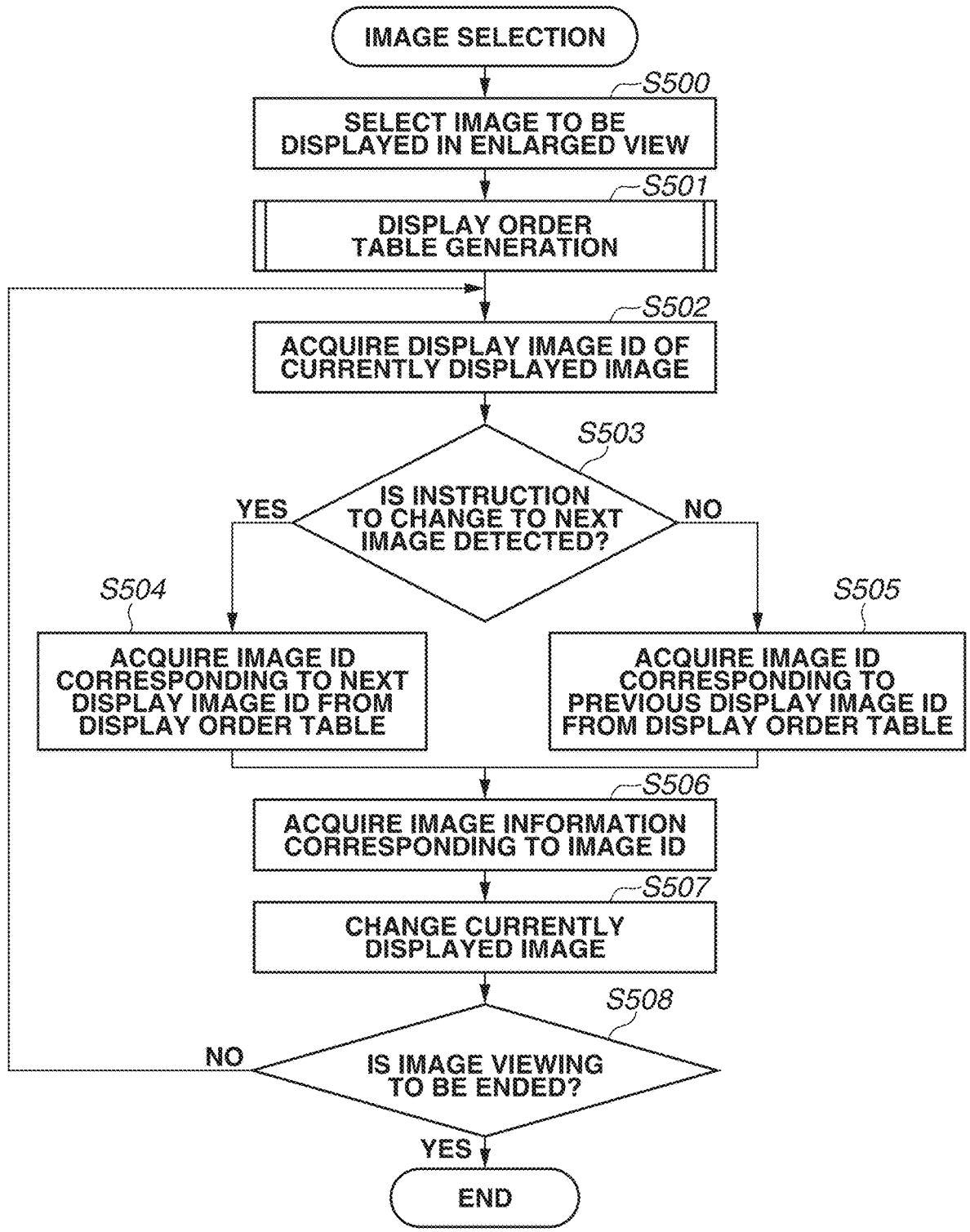
FIG. 5 is a flowchart illustrating an example of an image selection operation.

FIG. 5 is a flowchart illustrating image display processing performed by the image display apparatus. More specifically, the flowchart illustrates processing in which the operation unit 203 receives an operation of pressing a button and the image selection unit 204 selects the image to be displayed. Each step in the flowchart will be described with the prefix "S" added to the step number. The flowchart is started when an image viewer application is activated in the image display apparatus.

Figure 9A:
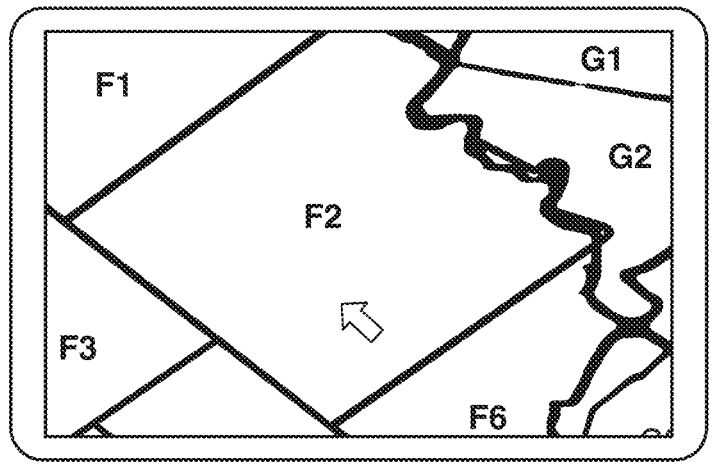
FIGS. 9A to 9C are views each illustrating an example of how an image is displayed.
Figure 9B:
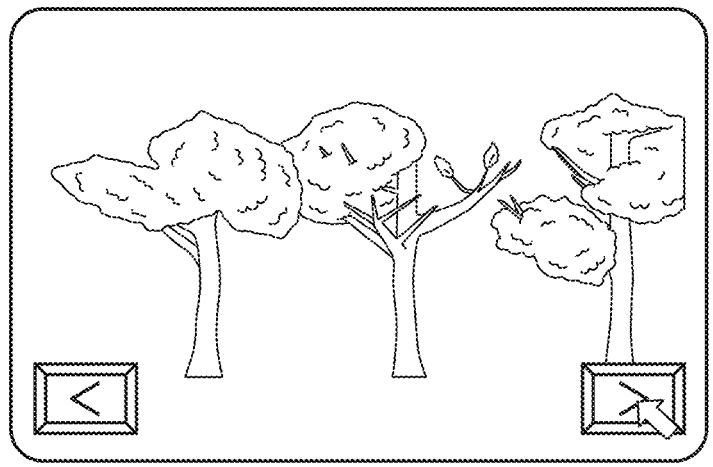

In step S500, the image display apparatus selects the image to be displayed in an enlarged view. FIG. 9A illustrates an example of a screen for allowing the operation unit 203 to receive, on a map displayed by the image display unit 205, designation of the imaging position of the image to be displayed in an enlarged view. The image display apparatus displays the map of the farm, and selects the image captured at the closest position to the position designated by the user on the map, as the image to be displayed in an enlarged view. Designating on the map the image to be displayed in an enlarged view is a mere example, and the image selection method is not limited thereto. For example, captured images may be displayed as a list of thumbnails, and the image designated by the user may be selected as the image to be displayed in an enlarged view. Alternatively, thumbnails of captured images are displayed on the map at positions corresponding to the imaging locations of the images, and the image to be displayed in an enlarged view may be determined based on an operation of selecting any of the displayed thumbnails. FIG. 9B illustrates how the image captured at the closest position to the position corresponding to the position designated by the user on the map is displayed.

In step S501, the image display apparatus generates the display order table 401 by performing the processing in the flowchart illustrated in FIG. 6 (described below). As described above, the display order table 401 is generated to manage the display order of the plurality of images managed by the image display apparatus. In step S501, the image display apparatus determines the display order of the plurality of images captured by the plurality of image capturing apparatuses installed on the movable body, based on the imaging direction of the image capturing apparatus in capturing each of the plurality of images, with respect to the traveling direction of the movable body. The processing for generating the display order table 401 for managing the display order is to be performed only in a case where there is an addition or an update to the images managed by the image display apparatus. In a case where the display order table 401 has already been generated, the processing in step S501 can be skipped. In addition, the processing in step S501 is described to be performed after the processing in step S500, but the processing order is not limited thereto, and the processing in step S501 may be performed before or simultaneously with the processing in step S500. Details of the processing in step S501 will be described below.

In step S502, the image display apparatus acquires the display image ID of the image that is currently displayed in an enlarged view. In step S503, the image display apparatus determines whether the operation received by the operation unit 203 is an operation for issuing an instruction to change the currently displayed image. The instruction to change the currently displayed image will be described now. To display an image in an enlarged view, the image display apparatus displays, for example, a screen illustrated in FIG. 9B. On the screen of FIG. 9B, an image is displayed in an enlarged view, and icons for issuing the instruction to change the currently displayed image are displayed together with the image. In a case where a user operation on any of the icons is detected, the image display apparatus determines that the operation for issuing the instruction to change the currently displayed image is received. At the same time, the image display apparatus determines an image change direction, in the display order, indicated by the received instruction. The determination of the image change direction is to determine whether to change the currently displayed image to the next image or the previous image in the display order (the order in which the images are sorted) managed by the display order table 401 generated in step S501. In the example of FIG. 9B, in a case where an operation on the right button (">") is received, the image display apparatus determines that an instruction to change the currently displayed image to the next image is issued, whereas in a case where an operation on the left button ("<") is received, the image display apparatus determines that an instruction to change the currently displayed image to the previous image is issued. In the example of FIG. 9B, a case where the right button is operated is illustrated. FIG. 9B is an example of a user interface displayed by the image display apparatus, and the positions of the buttons and the forms of the icons may be changed as needed.

The instruction to change the currently displayed image can be issued not only by the operation on the icon, but also by using other various methods. For example, the image display apparatus may determine that the instruction to change the currently displayed image is received when a swipe operation on the touch panel is detected, and may determine the image change direction based on the swipe direction. Alternatively, the image display apparatus may determine that the instruction to change the currently displayed image is received, based on detection of a press of a predetermined key on a keyboard. For example, in a case where an operation on the right arrow key on the keyboard is received, the image display apparatus may determine that the instruction to change the currently displayed image to the next image is issued, whereas in a case where an operation on the left arrow key is received, the image display apparatus may determine that the instruction to change the currently displayed image to the previous image is issued. Further alternatively, in a case where an operation on the up arrow key on the keyboard is received, the image display apparatus may determine that the instruction to change the currently displayed image to the next image is issued, whereas in a case where an operation on the down arrow key is received, the image display apparatus may determine that the instruction to change the currently displayed image to the previous image is issued. Further alternatively, the image display apparatus may determine that the instruction to change the currently displayed image is received, based on an operation on a widget such as a slider.

In step S503, in a case where the image display apparatus determines that the instruction to change the currently displayed image to the next image is detected (YES in step S503), then in step S504, the image display apparatus searches the display order table 401 for a record that matches the display image ID acquired in step S502. The image display apparatus then acquires the display image ID and the image ID from the record immediately following the record containing the display image ID acquired in step 502. More specifically, in step S503, the image display apparatus acquires information indicated by the record in the next row to the row of the record containing the display image ID acquired in step S502 in the display order table 401. In other words, in step S504, the image display apparatus acquires the image ID of the image immediately following the currently displayed image in the determined display order.

On the other hand, in step S503, in a case where the image display apparatus determines that the instruction to change the currently displayed image to the previous image is detected (NO in step S503), then in step S505, the image display apparatus searches the display order table 401 for a record that matches the display image ID acquired in step S502. The image display apparatus then acquires the display image ID and the image ID from the record immediately preceding the record containing the display image ID acquired in step S502. More specifically, in step S505, the image display apparatus acquires information indicated by the record in the previous row of the row of the record containing the display image ID acquired in step S502 in the display order table 401. In other words, in step S505, the image display apparatus acquires the image ID of the image immediately preceding the currently displayed image in the determined display order.

Figure 9C:
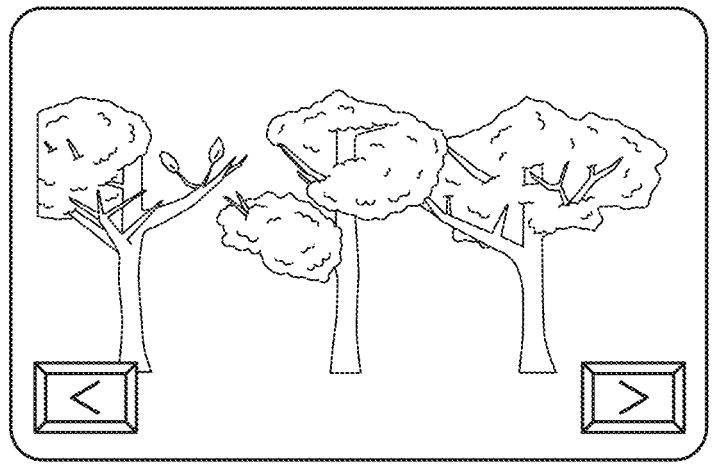

In step S506, the image display apparatus searches the image management tables 301 and 302 to acquire image information corresponding to the image ID acquired in step S504 or S505. The image display apparatus then outputs the display image ID acquired in step S504 or S505 and the acquired image information, as a result of selecting the image to be displayed. In step S507, the image display apparatus changes the currently displayed image based on the information output as the result. FIG. 9C illustrates how the image selected by the image selection unit 204 is displayed in response to the detection of the instruction to change the currently displayed image to the next image. In step S508, the image display apparatus determines whether to end the viewing of the images. For example, in a case where an instruction to end the image viewer application is issued, the image display apparatus determines to end the viewing of the images, whereas in a case where the instruction to end the image viewer application is not issued, the image display apparatus determines to not end the viewing of the images. In a case where the image display apparatus determines to end the viewing of the images, the processing ends, whereas in a case where the image display apparatus determines to not end the viewing of the images, the processing returns to step S502. As an alternative configuration, the processing may return to step S500 in a case where an instruction to designate the image to be displayed in an enlarged view is received on the map.

Next, details of the processing for generating the display order table 401 in step S501 will be described next with reference to the flowchart illustrated in FIG. 6.

In step S601, the image display apparatus sets a variable row to an initial value of 1. The variable row corresponds to the hedge number for identifying each of the plurality of imaging targets. In step S602, the image display apparatus searches the image management tables 301 and 302 to acquire all pieces of image information corresponding to the hedge number that matches the value of the variable row. For example, referring to the image management tables 301 and 302 of FIG. 3, in a case where the variable row is 1, the image information corresponding to the image IDs L1 to L100 with the hedge number 1 is acquired in step S602. The image information corresponding to the image IDs L1 to L100 may be acquired as an array from the image management table 301.

In step S603, the image display apparatus identifies the installation location in the acquired image information. At this time, the image display apparatus determines whether the installation location in the acquired image information is right or left. In other words, the image display apparatus identifies the imaging direction of the camera having captured the image corresponding to the acquired image information, with respect to the traveling direction. In the image capturing method illustrated in FIG. 8 according to the present exemplary embodiment, the images with the same hedge number are captured by the same camera. Thus, the installation location can be identified based on any one of the pieces of image information corresponding to the same hedge number.

In step S603, in a case where the image display apparatus determines that the installation location is not left, i.e., the installation location in the image information of the processing target is right (NO in step S603), the processing proceeds to step S604. In step S604, the image display apparatus sorts the acquired image information in reverse chronological order of image capturing. In a case where the image information corresponding to the image IDs R1 to R100 is acquired as an array from the image management table 302, since the image management table 302 registers the images in the order of image capturing, i.e., in chronological order of image capturing, the array is sorted in reverse order. Referring to the image management tables 301 and 302 of FIG. 3, in a case where the variable row is 2, the image information is sorted in the reverse chronological order of image capturing, i.e., in the order of R100, R99, . . . R2, and R1.

On the other hand, in step S603, in a case where the image display apparatus determines that the installation location is left (YES in step S603), the processing proceeds to step S608. In step S608, the image display apparatus sorts the acquired image information in the chronological order of image capturing. In a case where the image information corresponding to the image IDs L1 to L100 is acquired as an array from the image management table 301, since the image management table 301 registers the images in the order of image capturing, i.e., in the chronological order of image capturing, the order of the array is not changed. Referring to the image management tables 301 and 302 of FIG. 3, in a case where the variable row is 1, the image information is sorted in the chronological order of image capturing, i.e., in the order of L1, L2, . . . L99, and L100.

As described above, according to the present exemplary embodiment, the image display order is determined according to a different standard depending on whether the imaging direction is right or left with respect to the traveling direction of the movable body. Thus, regardless of whether the imaging direction is right or left with respect to the traveling direction of the movable body, the relationship between the image change direction and a transition in the positional relationship between the display targets before and after the image change is made constant. As a result, the user can intuitively change the displayed image, so that enhanced usability is achieved.

Furthermore, according to the present exemplary embodiment, in a case where the imaging direction is right with respect to the traveling direction of the movable body, the images are sorted in the reverse chronological order of image capturing, and this is determined as the display order. In a case where the imaging direction is left with respect to the traveling direction of the movable body, the images are sorted in the chronological order of image capturing, and this is determined as the display order. Accordingly, in a case where the right button is pressed to issue the instruction to change the currently displayed image to the next image in the order in which the images are sorted, the image of a crop located immediately on the right side of a grape tree (crop) in the currently displayed image can be displayed. In a case where the left button is pressed to issue the instruction to change the currently displayed image to the previous image in the order in which the images are sorted, the image of a crop located immediately on the left side of a grape tree (crop) in the currently displayed image can be displayed. More specifically, the image display apparatus determines the display order so that, in a case where an input indicating a rightward direction is detected while an image is displayed, the currently displayed image is changed to an image of a subject existing to the right of a subject of the currently displayed image with respect to the imaging direction of the image capturing apparatus having captured the currently displayed image. In addition, the image display apparatus determines the display order so that, in a case where an input indicating a leftward direction is detected while an image is displayed, the currently displayed image is changed to an image of a subject existing to the left of a subject of the currently displayed image with respect to the imaging direction of the image capturing apparatus having captured the currently displayed image. Thus, the direction indicated by the input for issuing the instruction to change the displayed image corresponds to the positional relationship between the subjects before and after the image change. This allows the user to intuitively change the displayed image, thereby achieving enhanced usability.

Figure 6:
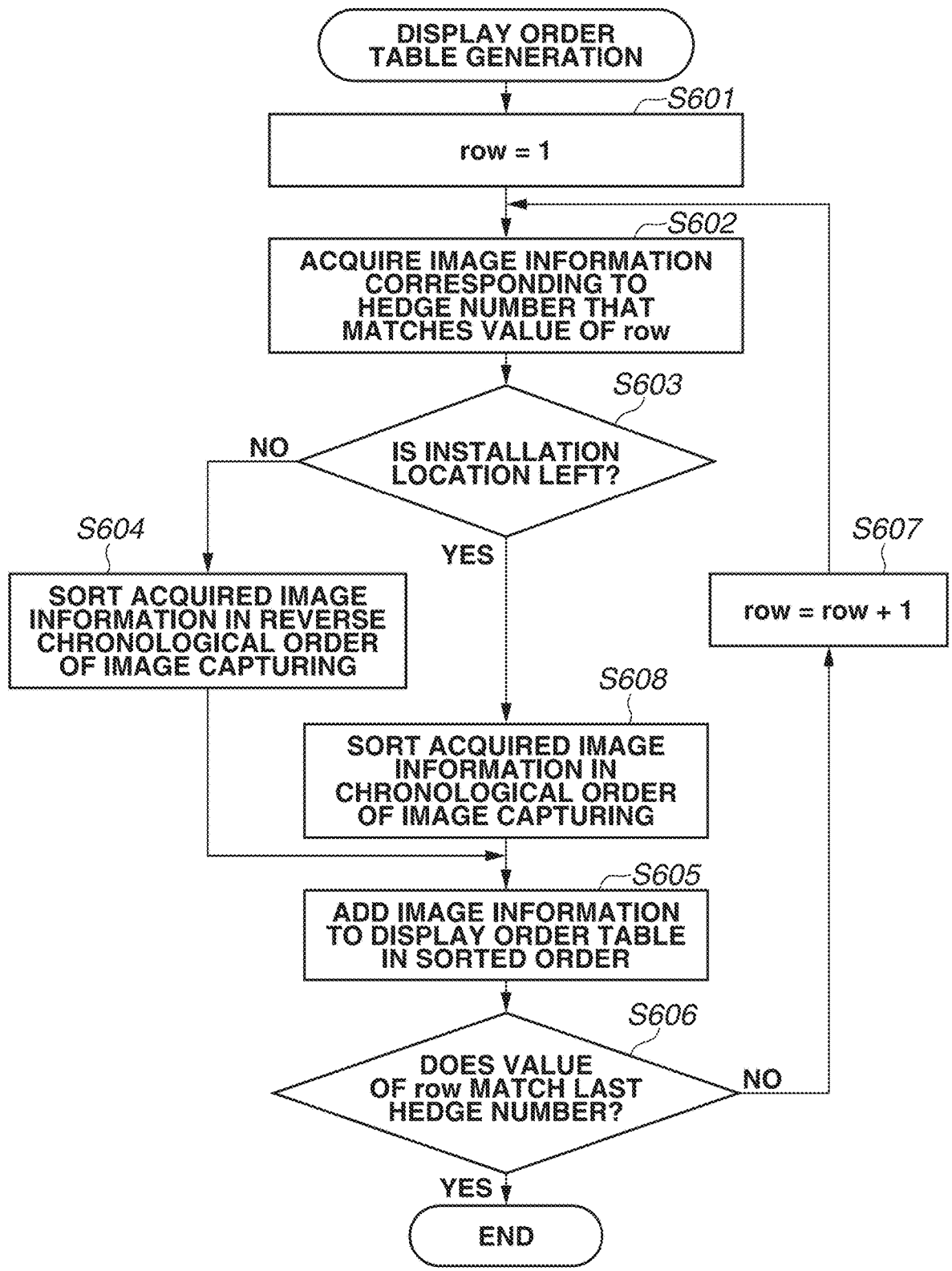
FIG. 6 is a flowchart illustrating an example of a display order table generation operation.

Returning to the description of the processing illustrated in the flowchart in FIG. 6, in step S605, the image display apparatus extracts the image information in the order in which the image information is sorted in step S604 or S608, and adds the extracted image information to the display order table 401. In step S606, the image display apparatus determines whether the value of the variable row matches the last hedge number. Until the value of the variable row matches the last hedge number, the image display apparatus increments the value of the variable row by one in step S607 to repeat steps S602 to S605. This processing combines the arrays in the order of the hedge numbers, so that the display order table 401 is generated.

As described above, according to the present exemplary embodiment, the growing conditions of crops of fruit trees planted and grown in hedge rows can be efficiently recorded by using the cameras installed on the movable body and configured to capture images of the crops on both the right and left sides of the movable body with respect to the traveling direction while the movable body moves between the hedge rows. Furthermore, in a case where the images captured in this manner are sequentially changed and displayed, the images are changed so as to correspond to the actual positional relationship between the crops, instead of simply changing the images in the order of image capturing, so that enhanced usability can be achieved. More specifically, according to the present exemplary embodiment, when the right button with the icon (">") indicating the rightward direction is pressed, the image of the crop located immediately on the right side of the crop in the currently displayed image is displayed regardless of whether the currently displayed image is captured by the right camera or the left camera. When the left button with the icon ("<") indicating the leftward direction is pressed, the image of the crop located immediately on the left side of the crop in the currently displayed image is displayed, so that the user can intuitively change the displayed image to a desired image.

Furthermore, the display order is determined so that the images of the same hedge, i.e., the images of each of the imaging targets are successively displayed. This allows the user to continuously view the images of the fruit trees planted in the same row, thereby making it easier to keep track of the growing conditions of the crops on a hedge-by-hedge basis.

While in the above-described exemplary embodiment, the example in which the displayed image is changed in response to an instruction operation from the user has been described, the display order control according to the above-described exemplary embodiment is not limited thereto and may be applied to, for example, display order control for a display form such as a slide show in which the displayed image is automatically changed.

While in the above-described exemplary embodiment, the example in which the imaging direction with respect to the traveling direction is either left or right has been described, the imaging direction is not limited thereto and may include other directions such as upward and downward directions.

While in the above-described exemplary embodiment, the example in which the input to the icon indicating the image change direction has been described as the example of the input indicating the image change direction, the input method is not limited thereto, and any other form may be used to detect the input indicating the image change direction. In a case where a swipe is used as the input indicating the image change direction, and a swipe operation of moving a finger from right to left across the touch panel is detected, the operation may be used as the input for issuing the instruction to change the currently displayed image to the next image in the sorted order. In a case where a swipe is used as the input indicating the image change direction and a swipe operation of moving a finger from left to right across the touch panel is detected, the operation may be used as the input for issuing the instruction to change the currently displayed image to the previous image in the sorted order.

Modification Example

In the above-described exemplary embodiment, the method has been described in which, when the right button (">") is pressed, the image of the crop located immediately on the right side of the crop in the currently displayed image is displayed uniformly, regardless of whether the currently displayed image is captured by the right camera or the left camera. However, there may be a case where the image of the crop immediately located on the right side of the crop in the currently displayed image cannot be displayed, for example, due to moving to a different hedge or interruption of imaging caused by an obstacle such as a pond or a hut.

In a modification example, in a case where there is a possibility that the image of the crop located immediately on the right side of the crop in the currently displayed image cannot be displayed, a message is displayed to prevent the user from being confused.

FIG. 10 is a flowchart illustrating processing performed by the image display unit 205 to display the image selected by the image selection unit 204.

In step S1001, the image display apparatus performs the processing in steps S502 to S506 in the flowchart in FIG. 5 to select the next image or the previous image as the image to be displayed. In step S1002, the image display apparatus determines whether the hedge number of the selected image and the hedge number of the currently displayed image are the same. In a case where the image display apparatus determines that the hedge number of the selected image and the hedge number of the currently displayed image are the same (YES in step S1002), the processing proceeds to step S1004. On the other hand, in a case where the image display apparatus determines that the hedge number of the selected image and the hedge number of the currently displayed image are not the same (NO in step S1002), then in step S1003, the image display apparatus displays a message indicating a shift to a different hedge, and the processing proceeds to step S1006. More specifically, in step S1003, the image display apparatus outputs information indicating that the imaging target is changed.

In step S1004, the image display apparatus calculates the distance between the imaging position of the selected image and the imaging position of the currently displayed image, and determines whether the calculated distance is less than a threshold value. In a case where the calculated distance is less than the threshold value (YES in step S1004), the processing proceeds to step S1006. The threshold value can be set to any value (e.g., 10 m) input by the user or can be determined based on the size of the farm or the distance between blocks in the farm. On the other hand, in a case where the distance between the imaging position of the selected image and the imaging position of the currently displayed image is not less than the threshold value (NO in step S1004), then in step S1005, the image display apparatus displays a message indicating that the imaging position changes significantly, and the processing proceeds to step S1006. More specifically, in step S1005, the image display apparatus outputs information indicating that there is a significant change between the imaging position of the image before the display change and the imaging position of the image after the display change.

In step S1006, the image display apparatus changes the currently displayed image to the selected image.

Figure 11A:
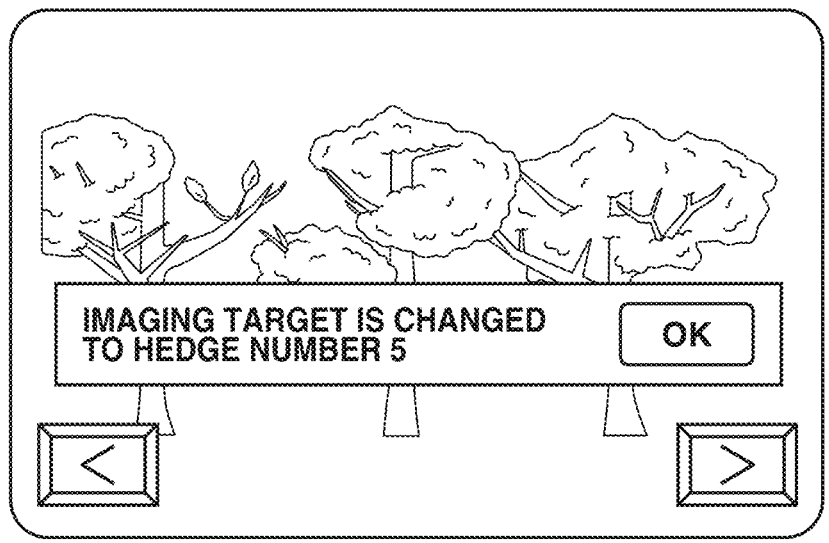
FIGS. 11A and 11B are views each illustrating an example of how a message is displayed.
Figure 11B:
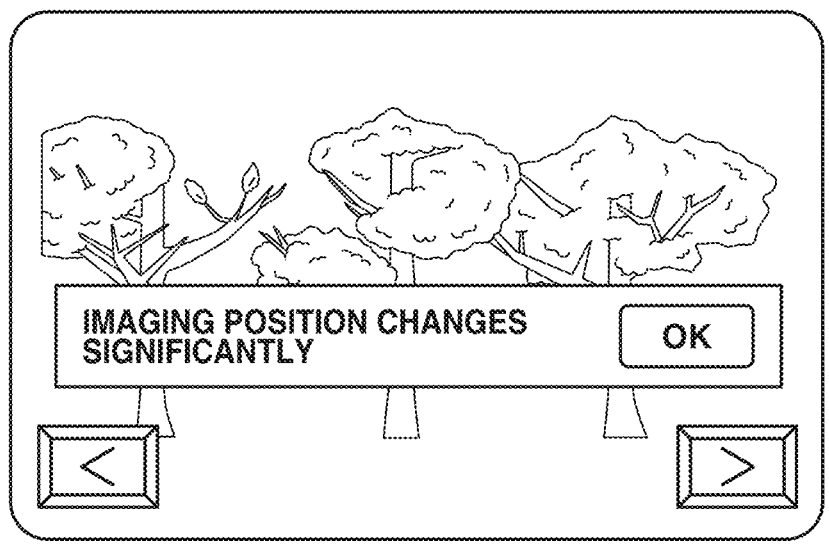

FIG. 11A illustrates an example of displaying the information indicating the shift to a different hedge, i.e., the change of the imaging target in a case where the hedge numbers are not the same. FIG. 11B illustrates an example of displaying the information indicating that the imaging position of the selected image is away from the imaging position of the currently displayed image in a case where the imaging positions are not close.

According to the above-described modification example, the messages notify the user in advance that the image of the crop located immediately on the right or left side of the crop in the currently displayed image is not displayed, so that the user is prevented from being confused.

In a case where only an image that satisfies a specific condition, such as an image of a disease, is to be viewed instead of viewing all images continuously, only the image ID of the image satisfying the specific condition is acquired in the image ID acquisition in step S504 or S505 in FIG. 5. In this case, the hedge number changes frequently between the images, or the imaging position changes significantly, so that the messages may be disabled from being displayed.

Furthermore, the display change in step S1006 can be performed at a high speed by use of the display order table 401. More specifically, image information of several images preceding and following the selected image is acquired based on the display order table 401, and the image files are read-ahead and cached, so that a technical effect of performing the display change at a high speed can be obtained.

The exemplary embodiment of the present invention is also implemented by supplying a program for implementing one or more functions according to the above-described exemplary embodiment to a system or an apparatus via a network or a storage medium, and causing one or more processors of a computer of the system or the apparatus to read and execute the program. In addition, the exemplary embodiment is implemented by a circuit (e.g., an application-specific integrated circuit (ASIC)) for implementing one or more functions according to the exemplary embodiment. Furthermore, the exemplary embodiment is implemented by a system including a plurality of devices (e.g., a host computer, an interface device, an image capturing apparatus, a web application).

While in the above-described exemplary embodiment, the case where images are captured for recording the growing conditions of grapes for wine has been described, the exemplary embodiment is not limited thereto, and the processing according to the exemplary embodiment is applicable to a case where images are captured for recording the growing conditions of the other crops. For example, the display control according to the above-described exemplary embodiment is applicable to display control of images captured for recording the conditions of the other crops grown using hedge cultivation in which hedges of crops are formed. Furthermore, a method for growing the crops to be recorded is not limited to the hedge cultivation, and the display control according to the exemplary embodiment is also applicable to captured images of crops planted along ridges and grown on ridge rows. In this case, images may be captured by image capturing apparatuses installed on not the above-described farming vehicle but a smaller movable body suitable for the spaces between the ridges.

While in the above-described exemplary embodiment, the case where images are captured for recording in farms in the agricultural field has been described as the example, the exemplary embodiment is not limited thereto. For example, the control according to the exemplary embodiment is applicable to control of display order of images of roads and nearby buildings that are captured by an image capturing apparatus installed on a vehicle.

According to the disclosed exemplary embodiment, the display order of a plurality of images captured by at least one image capturing apparatus installed on a movable body can be determined appropriately based on an imaging direction of the image capturing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-176843, filed Oct. 21, 2020, which is hereby incorporated by reference herein in its entirety.

What is claimed is:
1. An apparatus comprising:
one or more processors, wherein the one or more processors function as:
an acquisition unit configured to acquire a plurality of images captured by at least one image capturing apparatus installed on a movable body;
an identification unit configured to identify an imaging direction of the at least one image capturing apparatus in capturing each of the plurality of images, with respect to a traveling direction of the movable body;
a determination unit configured to determine a display order of the plurality of images based on a result of the identification by the identification unit; and a display control unit configured to cause a display unit to display the plurality of images based on the determined display order, wherein each of the plurality of images is a captured image of any one of a plurality of imaging targets including a first imaging target and a second imaging target, wherein the determination unit determines the display order of the plurality of images so that the images of the same imaging target are successively displayed, and wherein, in a case where the display control unit changes the displayed image from the captured image of the first imaging target to the captured image of the second imaging target based on the determined display order, the display control unit causes the display unit to display information indicating change of the imaging target.

2. The apparatus according to claim 1, wherein the determination unit determines the display order according to a different standard depending on whether the imaging direction is identified as right or left with respect to the traveling direction of the movable body by the identification unit.

3. The apparatus according to claim 1, wherein the determination unit determines the display order by sorting, in reverse chronological order of image capturing, the images for which the imaging direction is identified as right with respect to the traveling direction of the movable body by the identification unit, and by sorting, in chronological order of image capturing, the images for which the imaging direction is identified as left with respect to the traveling direction of the movable body by the identification unit.

4. The apparatus according to claim 1, wherein each of the plurality of imaging targets is a hedge of fruit trees planted in a row.

5. The apparatus according to claim 4, wherein the fruit trees are grape trees.

6. The apparatus according to claim 1,
wherein the one or more processors further function as a detection unit configured to detect an instruction that indicates an image change direction, and
wherein, in a case where the instruction is detected by the detection unit while a first image among the plurality of images is displayed, the display control unit changes the displayed image to the image immediately preceding or following the first image in the determined display order, based on the direction indicated by the instruction.

7. The apparatus according to claim 6,
wherein the detection unit detects an input indicating a rightward direction or an input indicating a leftward direction, and
wherein, in a case where the input indicating the rightward direction is detected by the detection unit while the first image is displayed, the display control unit changes the displayed image to the image immediately following the first image in the determined display order, and
wherein, in a case where the input indicating the leftward direction is detected by the detection unit while the first image is displayed, the display control unit changes the displayed image to the image immediately preceding the first image in the determined display order.

8. The apparatus according to claim 7,
wherein the at least one image capturing apparatus comprises an image capturing apparatus having captured the first image, and wherein the determination unit determines the display order so that, in a case where the input indicating the rightward direction is detected by the detection unit while the first image is displayed, the displayed image is changed to an image, among the plurality of images, that contains a subject existing to a right of a subject of the first image with respect to the imaging direction of the image capturing apparatus having captured the first image, and in a case where the input indicating the leftward direction is detected by the detection unit while the first image is displayed, the displayed image is changed to an image, among the plurality of images, that contains a subject existing to a left of the subject of the first image with respect to the imaging direction of the image capturing apparatus having captured the first image.

9. The apparatus according to claim 1, wherein, in a case where the display control unit changes the displayed image based on the determined display order, the display control unit causes the display unit to display information indicating that a distance between an imaging position of the image displayed before the change and an imaging position of the image displayed after the change is large.

10. An image display system including a movable body, at least one image capturing apparatus installed on the movable body, and an image display apparatus configured to display a plurality of images captured by the at least one image capturing apparatus, the image display system comprising:
one or more processors, wherein the one or more processors performs:
capturing the plurality of images using the at least one image capturing apparatus simultaneously with movement of the movable body;
identifying an imaging direction of the at least one image capturing apparatus in capturing each of the plurality of images, with respect to a traveling direction of the movable body;
determining a display order of the plurality of images based on a result of the identifying; and
causing a display unit to display the plurality of images based on the determined display order,
wherein each of the plurality of images is a captured image of any one of a plurality of imaging targets including a first imaging target and a second imaging target,
wherein the determined display order of the plurality of images of the same imaging target are successively displayed, and
wherein, in a case where the displayed image from the captured image of the first imaging target is changed to the captured image of the second imaging target based on the determined display order, further causing the display unit to display information indicating change of the imaging target.

11. An image display method comprising:
acquiring a plurality of images captured by at least one image capturing apparatus installed on a movable body;
identifying an imaging direction of the at least one image capturing apparatus in capturing each of the plurality of images, with respect to a traveling direction of the movable body;
determining a display order of the plurality of images based on a result of the identifying; and
causing a display unit to display the plurality of images based on the determined display order, wherein each of the plurality of images is a captured image of any one of a plurality of imaging targets including a first imaging target and a second imaging target, wherein the determined display order of the plurality of images of the same imaging target are successively displayed, and wherein, in a case where the displayed image from the captured image of the first imaging target is changed to the captured image of the second imaging target based on the determined display order, further causing the display unit to display information indicating change of the imaging target.

12. A non-transitory computer-readable storage medium storing a program for causing a computer to execute an image display method comprising:

acquiring a plurality of images captured by at least one image capturing apparatus installed on a movable body;

identifying an imaging direction of the at least one image capturing apparatus in capturing each of the plurality of images, with respect to a traveling direction of the movable body;

determining a display order of the plurality of images based on a result of the identifying; and causing a display unit to display the plurality of images based on the determined display order, wherein each of the plurality of images is a captured image of any one of a plurality of imaging targets including a first imaging target and a second imaging target, wherein the determined display order of the plurality of images of the same imaging target are successively displayed, and wherein, in a case where the displayed image from the captured image of the first imaging target is changed to the captured image of the second imaging target based on the determined display order, further causing the display unit to display information indicating change of the imaging target.

13. An apparatus comprising:

one or more processors, wherein the one or more processors function as:

an acquisition unit configured to acquire a plurality of images captured by at least one image capturing apparatus installed on a movable body;

an identification unit configured to identify an imaging direction of the at least one image capturing apparatus in capturing each of the plurality of images, with respect to a traveling direction of the movable body;

a determination unit configured to determine a display order of the plurality of images based on a result of the identification by the identification unit; and a display control unit configured to cause a display unit to display the plurality of images based on the determined display order, wherein the one or more processors further function as a detection unit configured to detect an instruction that indicates an image change direction, and wherein, in a case where the instruction is detected by the detection unit while a first image among the plurality of images is displayed, the display control unit changes the displayed image to the image immediately preceding or following the first image in the determined display order, based on the direction indicated by the instruction.

14. The apparatus according to claim 13, wherein the determination unit determines the display order according to a different standard depending on whether the imaging direction is identified as right or left with respect to the traveling direction of the movable body by the identification unit.

15. The apparatus according to claim 13, wherein the determination unit determines the display order by sorting, in reverse chronological order of image capturing, the images for which the imaging direction is identified as right with respect to the traveling direction of the movable body by the identification unit, and by sorting, in chronological order of image capturing, the images for which the imaging direction is identified as left with respect to the traveling direction of the movable body by the identification unit.

16. The apparatus according to claim 13, wherein each of the plurality of images is a captured image of any one of a plurality of imaging targets including a first imaging target and a second imaging target, and wherein the determination unit determines the display order of the plurality of images so that the images of the same imaging target are successively displayed.

17. The apparatus according to claim 16, wherein each of the plurality of imaging targets is a hedge of fruit trees planted in a row.

18. The apparatus according to claim 17, wherein the fruit trees are grape trees.

19. The apparatus according to claim 13, wherein the detection unit detects an input indicating a rightward direction or an input indicating a leftward direction, and wherein, in a case where the input indicating the rightward direction is detected by the detection unit while the first image is displayed, the display control unit changes the displayed image to the image immediately following the first image in the determined display order, and wherein, in a case where the input indicating the leftward direction is detected by the detection unit while the first image is displayed, the display control unit changes the displayed image to the image immediately preceding the first image in the determined display order.

20. The apparatus according to claim 19, wherein the at least one image capturing apparatus comprises an image capturing apparatus having captured the first image, and wherein the determination unit determines the display order so that, in a case where the input indicating the rightward direction is detected by the detection unit while the first image is displayed, the displayed image is changed to an image, among the plurality of images, that contains a subject existing to a right of a subject of the first image with respect to the imaging direction of the image capturing apparatus having captured the first image, and in a case where the input indicating the leftward direction is detected by the detection unit while the first image is displayed, the displayed image is changed to an image, among the plurality of images, that contains a subject existing to a left of the subject of the first image with respect to the imaging direction of the image capturing apparatus having captured the first image.

21. The apparatus according to claim 13, wherein, in a case where the display control unit changes the displayed image based on the determined display order, the display control unit causes the display unit to display information indicating that a distance between an imaging position of the image displayed before the change and an imaging position of the image displayed after the change is large.

22. An image display system including a movable body, at least one image capturing apparatus installed on the movable body, and an image display apparatus configured to display a plurality of images captured by the at least one image capturing apparatus, the image display system comprising:
  one or more processors, wherein the one or more processors performs:
  capturing the plurality of images using the at least one image capturing apparatus simultaneously with movement of the movable body;
  identifying an imaging direction of the at least one image capturing apparatus in capturing each of the plurality of images, with respect to a traveling direction of the movable body;
  determining a display order of the plurality of images based on a result of the identifying;
  causing a display unit to display the plurality of images based on the determined display order; and
  detecting an instruction that indicates an image change direction,
  wherein, in a case where the instruction is detected while a first image among the plurality of images is displayed, the displayed image is changed to the image immediately preceding or following the first image in the determined display order, based on the direction indicated by the instruction.

23. An image display method comprising:
  acquiring a plurality of images captured by at least one image capturing apparatus installed on a movable body;
  identifying an imaging direction of the at least one image capturing apparatus in capturing each of the plurality of images, with respect to a traveling direction of the movable body;
  determining a display order of the plurality of images based on a result of the identifying;
  causing a display unit to display the plurality of images based on the determined display order; and
  detecting an instruction that indicates an image change direction,
  wherein, in a case where the instruction is detected while a first image among the plurality of images is displayed, the displayed image is changed to the image immediately preceding or following the first image in the determined display order, based on the direction indicated by the instruction.

24. A non-transitory computer-readable storage medium storing a program for causing a computer to execute an image display method comprising:
  acquiring a plurality of images captured by at least one image capturing apparatus installed on a movable body;
  identifying an imaging direction of the at least one image capturing apparatus in capturing each of the plurality of images, with respect to a traveling direction of the movable body;
  determining a display order of the plurality of images based on a result of the identifying;
  causing a display unit to display the plurality of images based on the determined display order; and
  detecting an instruction that indicates an image change direction,
  wherein, in a case where the instruction is detected while a first image among the plurality of images is displayed, the displayed image is changed to the image immediately preceding or following the first image in the determined display order, based on the direction indicated by the instruction.

25. An apparatus comprising:
  one or more processors, wherein the one or more processors function as:
  an acquisition unit configured to acquire a plurality of images captured by at least one image capturing apparatus installed on a movable body;
  an identification unit configured to identify an imaging direction of the at least one image capturing apparatus in capturing each of the plurality of images, with respect to a traveling direction of the movable body;
  a determination unit configured to determine a display order of the plurality of images based on a result of the identification by the identification unit; and
  a display control unit configured to cause a display unit to display the plurality of images based on the determined display order,
  wherein, in a case where the display control unit changes the displayed image based on the determined display order, the display control unit causes the display unit to display information indicating that a distance between an imaging position of the image displayed before the change and an imaging position of the image displayed after the change is large.

26. The apparatus according to claim 25, wherein the determination unit determines the display order according to a different standard depending on whether the imaging direction is identified as right or left with respect to the traveling direction of the movable body by the identification unit.

27. The apparatus according to claim 25, wherein the determination unit determines the display order by sorting, in reverse chronological order of image capturing, the images for which the imaging direction is identified as right with respect to the traveling direction of the movable body by the identification unit, and by sorting, in chronological order of image capturing, the images for which the imaging direction is identified as left with respect to the traveling direction of the movable body by the identification unit.

28. The apparatus according to claim 25,
  wherein each of the plurality of images is a captured image of any one of a plurality of imaging targets including a first imaging target and a second imaging target, and
  wherein the determination unit determines the display order of the plurality of images so that the images of the same imaging target are successively displayed.

29. The apparatus according to claim 28, wherein each of the plurality of imaging targets is a hedge of fruit trees planted in a row.

30. The apparatus according to claim 29, wherein the fruit trees are grape trees.

31. The apparatus according to claim 25,
  wherein the one or more processors further function as a detection unit configured to detect an instruction that indicates an image change direction, and
  wherein, in a case where the instruction is detected by the detection unit while a first image among the plurality of images is displayed, the display control unit changes the displayed image to the image immediately preceding or following the first image in the determined display order, based on the direction indicated by the instruction, wherein the detection unit detects an input indicating a rightward direction or an input indicating a leftward direction, and wherein, in a case where the input indicating the rightward direction is detected by the detection unit while the first image is displayed, the display control unit changes the displayed image to the image immediately following the first image in the determined display order, and wherein, in a case where the input indicating the leftward direction is detected by the detection unit while the first image is displayed, the display control unit changes the displayed image to the image immediately preceding the first image in the determined display order.

32. The apparatus according to claim 31, wherein the at least one image capturing apparatus comprises an image capturing apparatus having captured the first image, and wherein the determination unit determines the display order so that, in a case where the input indicating the rightward direction is detected by the detection unit while the first image is displayed, the displayed image is changed to an image, among the plurality of images, that contains a subject existing to a right of a subject of the first image with respect to the imaging direction of the image capturing apparatus having captured the first image, and in a case where the input indicating the leftward direction is detected by the detection unit while the first image is displayed, the displayed image is changed to an image, among the plurality of images, that contains a subject existing to a left of the subject of the first image with respect to the imaging direction of the image capturing apparatus having captured the first image.

33. An image display system including a movable body, at least one image capturing apparatus installed on the movable body, and an image display apparatus configured to display a plurality of images captured by the at least one image capturing apparatus, the image display system comprising:

one or more processors, wherein the one or more processors performs:

capturing the plurality of images using the at least one image capturing apparatus simultaneously with movement of the movable body;

identifying an imaging direction of the at least one image capturing apparatus in capturing each of the plurality of images, with respect to a traveling direction of the movable body;

determining a display order of the plurality of images based on a result of the identifying; and causing a display unit to display the plurality of images based on the determined display order, wherein, in a case where the displayed image is changed based on the determined display order, further causing the display unit to display information indicating that a distance between an imaging position of the image displayed before the change and an imaging position of the image displayed after the change is large.

34. An image display method comprising:

acquiring a plurality of images captured by at least one image capturing apparatus installed on a movable body;

identifying an imaging direction of the at least one image capturing apparatus in capturing each of the plurality of images, with respect to a traveling direction of the movable body;

determining a display order of the plurality of images based on a result of the identifying; and causing a display unit to display the plurality of images based on the determined display order, wherein, in a case where the displayed image is changed based on the determined display order, further causing the display unit to display information indicating that a distance between an imaging position of the image displayed before the change and an imaging position of the image displayed after the change is large.

35. A non-transitory computer-readable storage medium storing a program for causing a computer to execute an image display method comprising:

acquiring a plurality of images captured by at least one image capturing apparatus installed on a movable body;

identifying an imaging direction of the at least one image capturing apparatus in capturing each of the plurality of images, with respect to a traveling direction of the movable body;

determining a display order of the plurality of images based on a result of the identifying; and causing a display unit to display the plurality of images based on the determined display order, wherein, in a case where the displayed image is changed based on the determined display order, further causing the display unit to display information indicating that a distance between an imaging position of the image displayed before the change and an imaging position of the image displayed after the change is large.

* * * * *